Aug. 16, 1932.    J. TACKMAN    1,872,361
ROTARY ENGINE
Filed March 12, 1926    6 Sheets-Sheet 1

INVENTOR
John Tackman

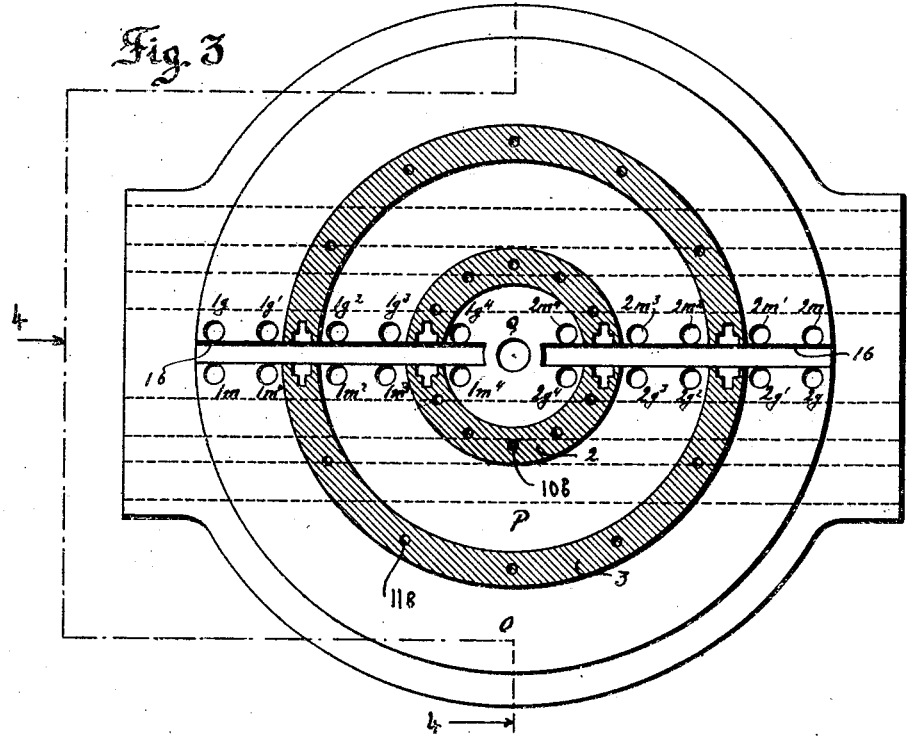
Fig. 3
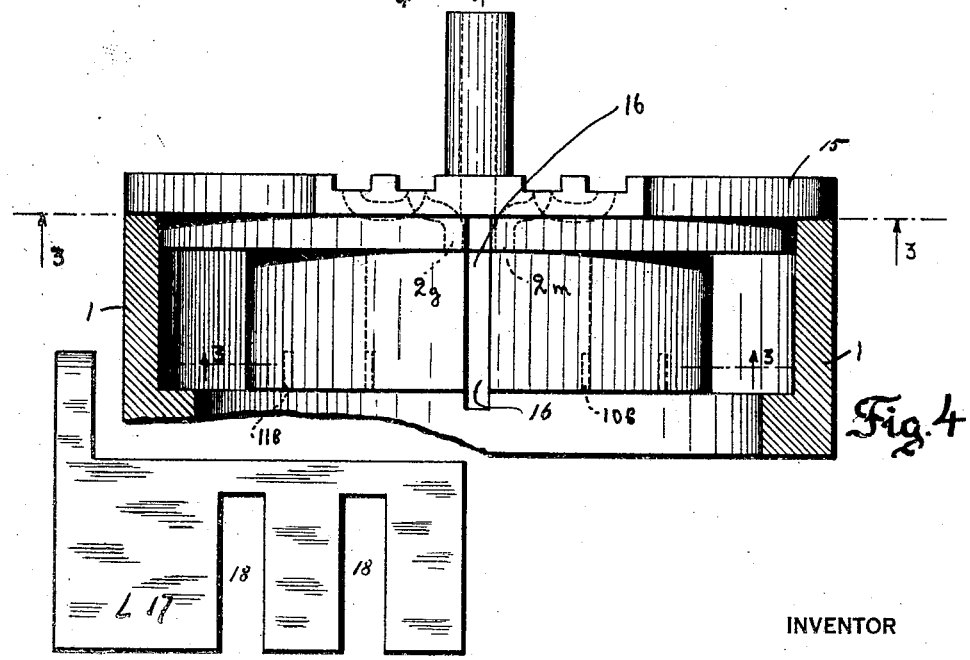
Fig. 4
Fig. 5
INVENTOR
John Tackman

Aug. 16, 1932.  J. TACKMAN  1,872,361
ROTARY ENGINE
Filed March 12, 1926   6 Sheets-Sheet 3
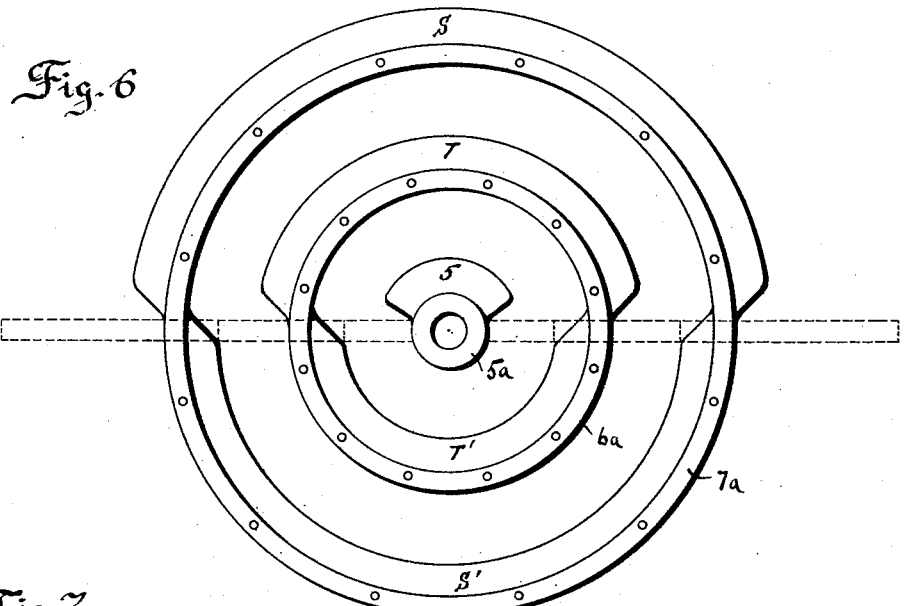
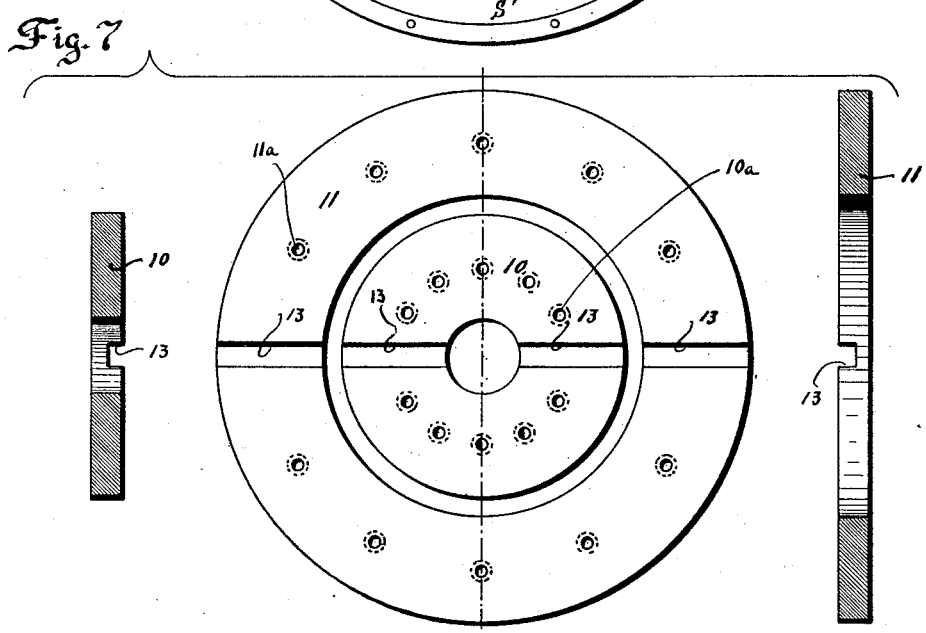
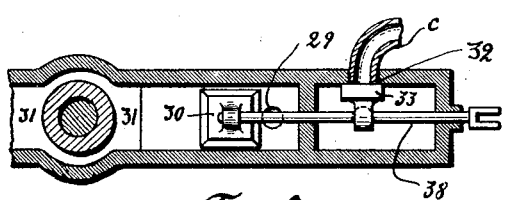
INVENTOR
John Tackman Aug. 16, 1932.  J. TACKMAN  1,872,361
ROTARY ENGINE
Filed March 12, 1926   6 Sheets-Sheet 4

INVENTOR
John Tackman

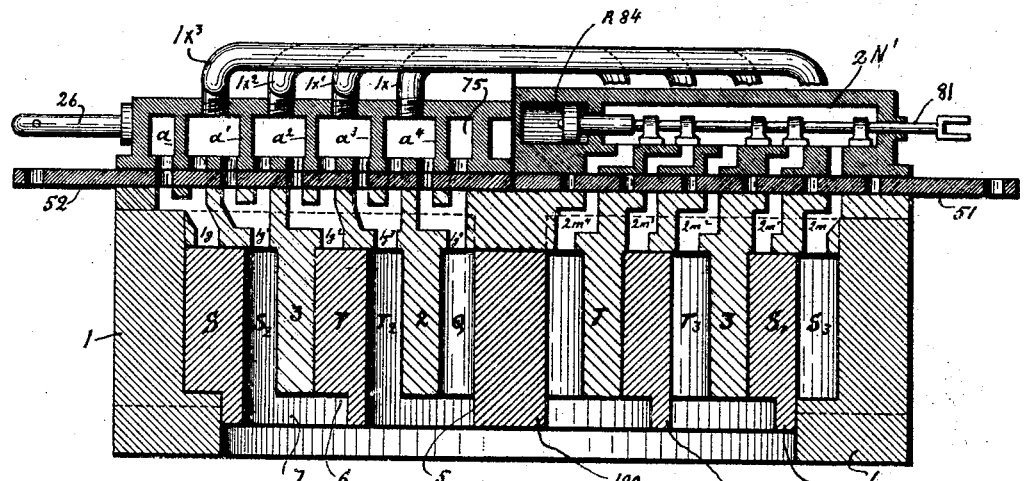

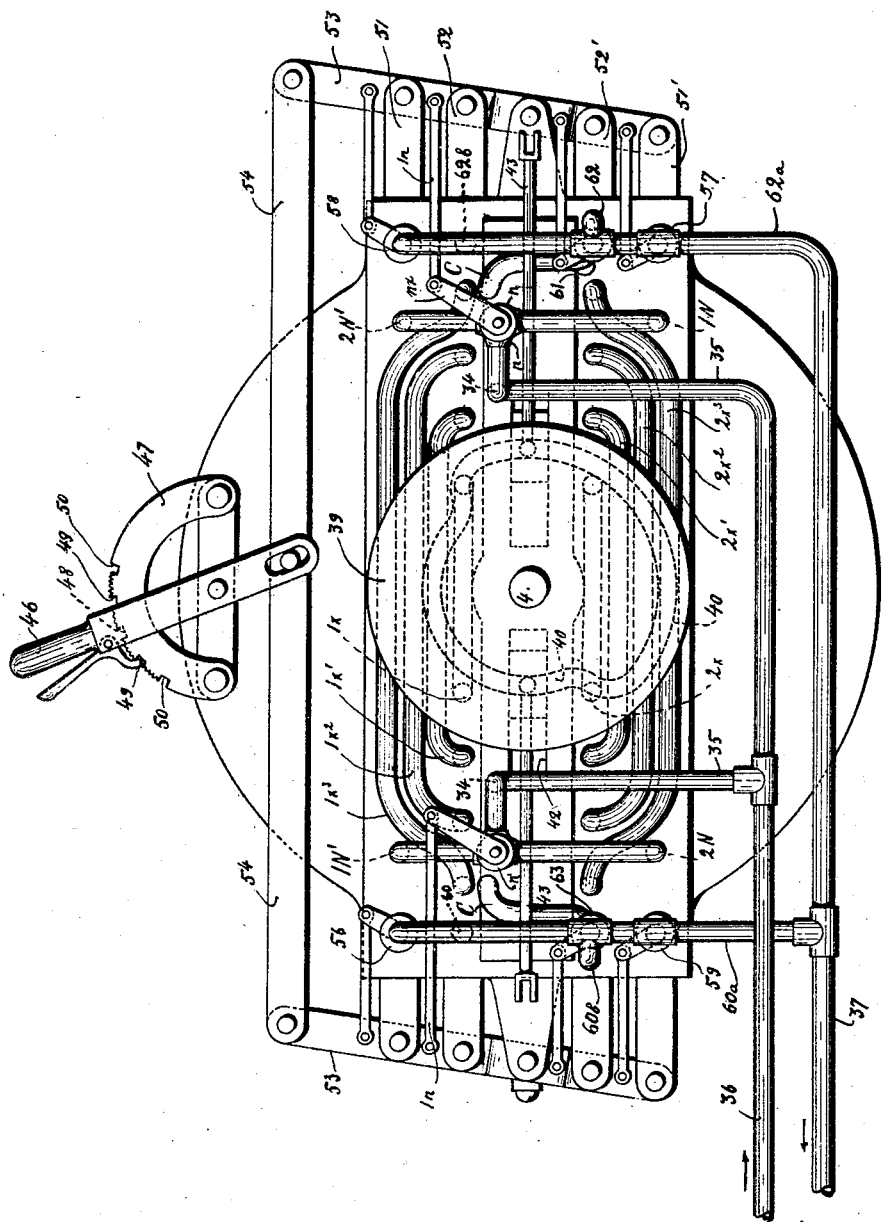

Patented Aug. 16, 1932

1,872,361

UNITED STATES PATENT OFFICE

JOHN TACKMAN, OF NEW YORK, N. Y.

ROTARY ENGINE

Application filed March 12, 1926. Serial No. 94,182.

This invention relates to an improved type of rotary engine. The engine is so constructed that it may be run as a multiple expansion engine or as a direct acting engine. In accordance with the invention the rotor of the engine has a plurality of rotor members all mounted on a common shaft, and these rotor members are adapted to operate in individual expansion chambers. The various novel features of the invention will appear from the detailed description taken in connection with the accompanying drawings and will be particularly pointed out in the claims.

Fig. 3 is an elevational and sectional view looking into the engine cylinder, the view being taken on line 3—3 of Fig. 4.

Fig. 4 is a plan view of the engine cylinder viewed from the right of Fig. 3.

Fig. 5 is a detail view in plan of one of the abutments shown in Figs. 1 and 2.

Fig. 6 is an elevation looking at the rotor along the axis, the abutment positions being shown in dotted lines, the construction being such that at the moment one abutment is closed the other is ready to open.

Fig. 7 is a three part view showing the two disklike members between which and the removable cylinder head the hub flange of the rotary piston operates, both of said members being provided with a diametral groove in which one side of each abutment is adapted to be slidably supported.

Fig. 8 is a fragmentary detail view of certain valve mechanism taken on the line 8—8 of Fig. 2.

Figure 1:
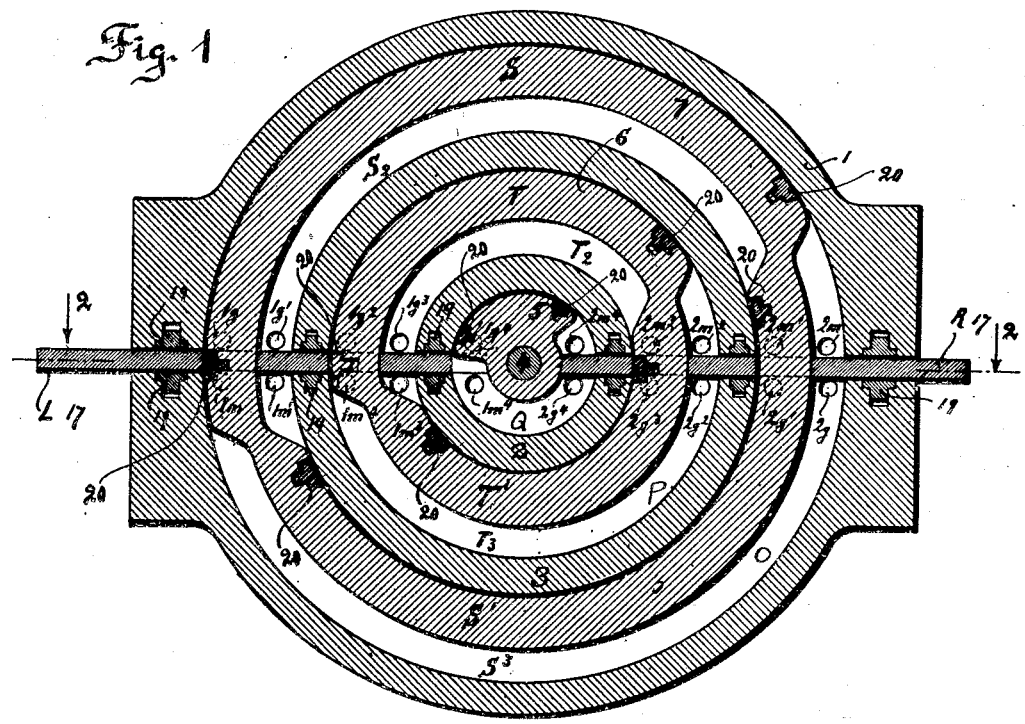
Fig. 1 is a cross sectional view taken through the engine cylinders on the diameter thereof and showing the rotary pistons as consisting of two annular members and a central segmental member,—the abutment members which cooperate with the piston members and cylinder walls being also shown,—the view as a whole being taken on line 1—1 of Fig. 2.

Fig. 11 is a transverse sectional view, that portion above the slide valves 51 and 52 including said slide valves, being taken on line 11—11 of Fig. 10; that portion including the ports $1g$—$1g^4$ and $2m$—$2m^4$ and that portion below said ports being taken on the line $11a$—$11a$.

Fig. 12 is a detail on an enlarged scale of one of the three-way inlet valves for direct expansion only and for controlling the clockwise or counter-clockwise movement of the rotor.

Fig. 13 illustrates the end of the engine upon which the controlling mechanism is located.

Fig. 14 is a disassembled view of certain parts which fit into the adjacent cylinder shown in Fig. 11.

The rotor and its cylinders will first be described. The engine as shown comprises three concentric cylinders, namely, an outer cylinder 1, a central cylinder 2, and a cylinder 3 therebetween. The annular chamber formed between the outer cylinder 1 and next adjacent cylinder 3 may conveniently be referred to as chamber O; and the annular chamber between the central cylinder 2 and the surrounding cylinder 3 as chamber Q. Cylinders 2 and 3 may conveniently be formed as a unit and the outer cylinder 1 may be secured thereto in any suitable manner. See Fig. 4.

The rotor comprises a shaft 4; a segmental rotor element 5 fixed to the shaft and adapted to turn within the central chamber Q; an annular member 6 disposed within the annular chamber P, and an annular member 7 disposed within its chamber O. The rotor shaft has also fixed thereto a hub-flange 8 (see Figs. 2 and 14) which extends within the outer cylinder 1 for a short distance. The annular members 6 and 7 are secured to said flange in any suitable manner as by bevelled screws 9.

Figure 2:
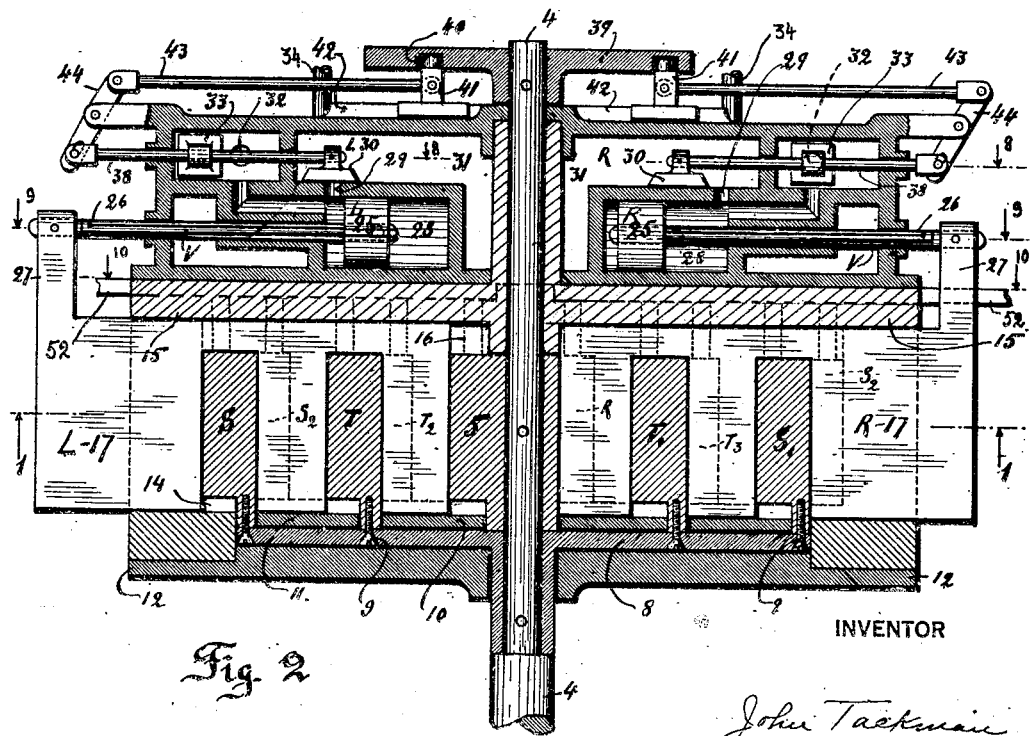
Fig. 2 is a sectional view taken on line 2—2 of Fig. 1 and showing the abutments of Fig. 1 in plan and the operating means therefor.

Abutting the open end of the inner cylinder 2 is a circular plate or disk 10 of somewhat greater diameter than the external diameter of said cylinder and abutting the open end of cylinder 3 is a circular plate or disk 11 of somewhat greater diameter than its cylinder. Referring to Figs. 2 and 7 it will be noted that an annular space is formed between the two plates or disks and between the outer cylinder 1 and the larger plate, and that the annular members 6 and 7 extend therethrough into abutting relation with the hub flange 8. The construction is such that the rotor may rotate freely in the cylinders. The entrance to the cylinders is closed by a cylinder head 12 suitably secured to the rim of the outer cylinder 1. The plate or disk 10 has a steam tight fit with the annular parts 5a and 6a of the rotor members 5 and 6. The plate or disk 10 is suitably secured to the cylinder 2. In the embodiment of my invention shown I preferably employ properly constructed bolts the screw-threaded ends of which pass through the perforations 10a and and engage correspondingly shaped screw-threaded sockets 10b in the cylinder 2. The plate or disk 11 has also a steam tight fit with the annular parts 6a and 7a of the rotor members 6 and 7. The plate 11 is suitably secured to the cylinder 3 and for this purpose I preferably employ properly constructed bolts the screw-threaded ends of which pass through the perforations 11a and engage correspondingly shaped screw-threaded sockets 11b.

The inside faces of the circular plates 10 and 11 are provided with aligned diametral slots or grooves 13. A continuation of this groove is formed in the cylinder 1 as indicated at 14. The opposite cylinder head 15 is provided with a similar diametral groove 16 parallel to the aforesaid grooves. These two diametral parallel grooves form guide ways for a pair of abutments L 17 and R 17 both exactly alike. Each abutment has reentrant portions or slots 18 (see Fig. 5) of a width to receive the annular rotor members 6 and 7, one in each slot. The cylinders 1, 2 and 3 are split on their diameters forming a continuation of the groove 16 to provide a passage for the abutments, and suitable packing 19 is provided in their opposed edges to form steam tight joints with the abutments (Fig. 1).

To facilitate an understanding of the engine some reference characters will be preceded by the letters L and R to designate left or right as the case may be. When a reference numeral having L or R before it is referred to by numeral only both right and left parts are intended to be included in the description.

The rotor members 6 and 7 are each formed on two different diameters. The diameter of substantially one-half of an individual member is such that its exterior surface will make a close fit with the surrounding cylinder and the other half is of such diameter that it will make a close fit with the inner cylinder. For convenience of reference the section of largest diameter of member 7 will be designated S and the smaller section thereof S'. Similarly the corresponding sections of member 6 will be designated T and T' respectively. Each of said sections is preferably provided with one or more packing strips 20. The inner segmental rotor member is also provided with one or more packing strips 20. It may be stated at this point that at the moment one abutment has been moved inwardly, in the operation of the engine, to its closed position the other is ready to begin to move outwardly to open the same.

The thickness of each section of the annular rotor members 6 and 7 is such that each of the chambers O and P between the three cylinders is divided by said sections into two distinct inside and outside chambers. For convenience of reference the chamber on the inner side of the larger section S of annular member 7 will be designated $S^2$ and the chamber on the outer side of section S' thereof as $S^3$. The chamber on the inner side of the larger section T of annular member 6 will be designated $T^2$ and that on the outer side of section T' thereof as $T^3$.

As previously pointed out, the abutments have slots 18 (see Fig. 5) within which the annular rotor members 6 and 7 are movably received. Inasmuch as each annular member is composed of two sections of different diameters, the two abutments must be shifted from one section to the other of the annular member as the rotor turns about its axis. The purpose of this shifting will be presently explained.

The abutments may be shifted by any suitable means properly synchronized with the rotor shaft. In the present showing the abutments have been shown as shiftable by fluid pressure but it is to be distinctly understood that the invention is not limited to the abutment shifting means shown and described herein as it will be readily appreciated by those skilled in the art that different arrangements may be employed for the purpose indicated without departing from the spirit of the invention. In accordance with the present showing, the abutments are connected to individual pistons 25 (L and R) which have their individual piston rods 26 secured to their respective abutments as by lateral extensions 27 at the outer extremities thereof These pistons are subject to steam pressure on one side only, (the piston-rod side in accordance with the present showing) and when so subjected cause their respective abutments to move inwardly i. e. toward the axis of the rotor. When in the sequence of operation the abutments must move outwardly. they are so moved by the steam pressure within the annular chambers, and the central chamber, the pressure being effective on the inwardly-facing edges of the shuttles, the flow of steam to the pistons being cut off at such times and exhausted. As the piston members 6 and 7 and the rotary abutment 5 rotate the abutments formed between the parts, say, S and S' and T and T' engage the edges of the reciprocal abutments to move them in return direction slightly, thereby permitting the steam pressure within the respective cylinders to get behind the abutments 17 and complete their return movement. The pistons operate in individual cylinders 28 and steam flows into the cylinder by individual ports 29 controlled by individual valves 30 (L and R) within steam chests 31. Steam is exhausted from said cylinders through individual ports 32 controlled by individual valves 33. In the present showing the ports 32 are each shown as interrupted by and communicate with chambers within which the individual valves 33 operate, the chambers serving to separate the valves from the steam pressure in the steam chest 31.

Referring to Fig. 13, steam is supplied to the steam chest 31 through individual passages 34 by pipes 35 which are connected to a common steam supply main 36. The steam exhausted through ports 32 passes to an exhaust pipe 37 through suitable ports, pipes C and C, and valves 61 and 63, said valves being closed to prevent the exhaust of steam through C, C when the engine is operating in multiple expansion. See Figs. 8 and 13. In order to prevent the abutment pistons from cushioning in their cylinders (the piston-head side) a suitable vent (not shown) is provided. The vent V may, if desired, be made through the piston rods 26 of said pistons.

The two sets of valves 30 and 33 are operated in exactly the same manner. The description of the mode of operation will, therefore, be confined to one set of valves, the same reference characters referring to similar parts in both sets. The two valves 30 and 33 are mounted on a common valve rod 38 which is reciprocated in synchronism with the rotor shaft, in any suitable manner, as for example by a link rod and lever mechanism operated by a cam on the shaft. The cam is shown as a disk 39 having a cam slot 40 within which extends a follower which projects laterally from a cross head to a lever 44 which is connected by a pin and slot connection to the valve rod 38. The cam slot 40 is of such form that when one of the abutment pistons 25 has received steam for a full stroke the other begins to open to exhaust, it being understood, of course, that the cam slot 40 is so constructed and so related to other associated mechanism as to enable the abutments to move at the proper time.

Figure 9:
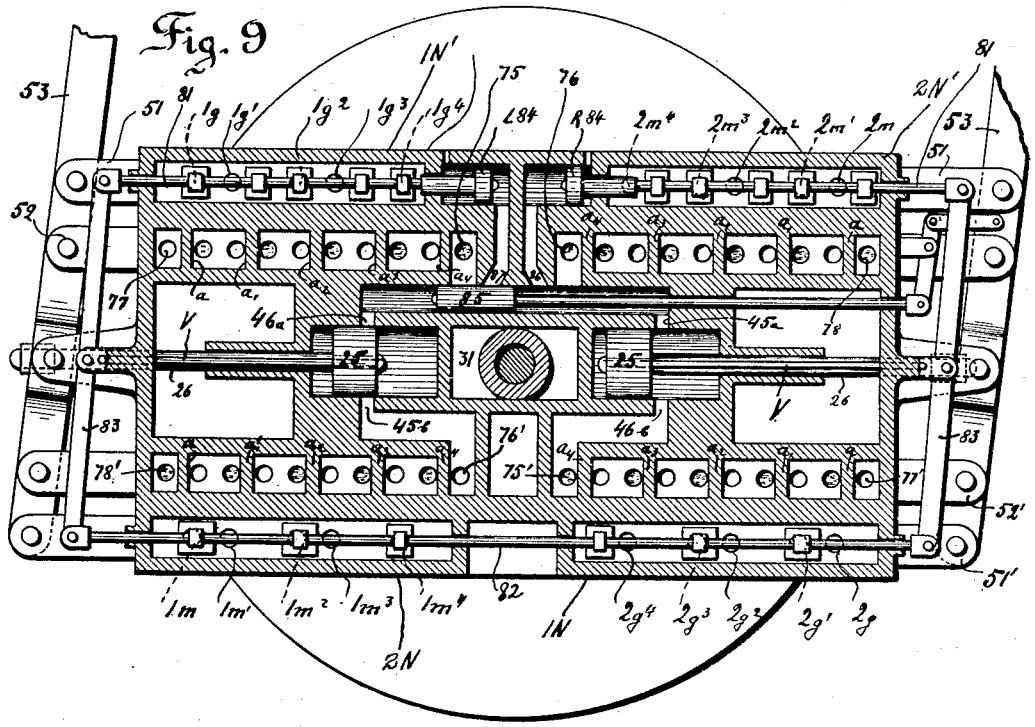
Fig. 9 is a vertical sectional view taken on line 9—9 of Fig. 2 of the valve mechanism of the engine.

Each piston 25 in addition to moving an abutment also controls ports 45 and 46 (a and b), see Fig. 9, the ports being opened to steam when the piston has been moved by the steam pressure entering by way of port 29 (see Fig. 2). The purpose of said ports 45 and 46 will hereinafter be more fully explained.

The engine is adapted to rotate clockwise and counter-clockwise and is adapted to utilize high pressure steam in each of its three rotor chambers O, P and Q, or to use the steam in multiple expansion stages, that is to say, from the inner chamber Q to chamber P and from chamber P to chamber O. The manual engine-controlling member is shown as a lever 46 (Fig. 13) which may be placed in five different positions, namely; in a neutral position when it is desired to stop the engine; in two positions to the right of the neutral position when it is desired to operate the engine as a multiple-expansion engine, or as a direct acting engine, respectively; and in two corresponding positions on the left of the neutral position when it is desired to have the rotor rotate in the opposite direction. A sector 47 is shown associated with the controlling lever, the five notches therein indicating the five positions referred to, the middle notch 48 being the neutral position, the next adjacent notches 49 being the multiple expansion position, and the two other notches 50 being the direct-acting position. In the construction illustrated the engine will operate in a clockwise direction when the controlling lever 46 is set to engage notches 49 and 50 located on the left hand side of the sector 47 and to operate in a counter-clockwise direction when the controlling lever 46 is set to engage the notches 49 and 50 located on the right hand side of the sector 47. It will be understood that the engine can be throttled down in the usual way.

Lever 46 operates two groups of valve bars. The two upper group of bars are designated 51 and 52 while the two lower bars are designated 51' and 52'. Levers 53 connect the free ends of the bars, the levers being joined by a link 54 which is connected to the controlling lever 46 by a pin and slot connection. The function of these valve bars will presently appear. It may be here noted that when the engine is operated in multiple expansion the steam is admitted to the engine through the ports in the valve bars 52 and 52' the flow of steam through the ports of the valve bars 51 and 51' being cut off. When the engine is operating as a direct acting engine steam is admitted to the rotor through the ports in the valve bars 51 and 51' the flow of steam through the valve bars 52 and 52' being cut off. It may also be noted at this point that the position of the various parts, as illustrated in Figs. 9, 10 and 13, is such that the engine operates counterclockwise; and that it is set to use multiple expansion of the steam in each of the rotor chambers.

Opening into the rotor chambers O, P and Q are a plurality of groups of ports (Fig. 1). Associated with the left hand abutment L 17 are the $1m$ and $1g$ groups of ports and associated with the right hand abutment R 17 are the $2m$ and $2g$ groups of ports (see also Fig. 10). Assuming that the rotor is rotating counter-clockwise as viewed from Fig. 1 and that the engine is set to use the full steam pressure in each of the rotor chambers ($S^2$ and $S^3$ etc.) the flow of steam will be as follows: Live steam will enter by way of ports $2m^4$, $2m^2$, and $2m$ above the right abutment R 17 and will also enter ports $1m^3$ and $1m^1$ below the left abutment L 17. The steam after having imparted a one-half revolution to the rotor will exhaust in the following manner. The steam which entered through ports $2m^4$, $2m^2$ and $2m$ will exhaust through ports $1g^4$, $1g^2$ and $1g$ respectively, above the left abutment L 17. Steam which entered through ports $1m^3$ and $1m^1$ will exhaust through ports $2g^3$ and $2g'$, respectively below the right abutment R 17. Port $1m^4$, $1m^2$ and $1m$ are inactive when steam is entering by way of ports $1m^3$ and $1m'$. After the rotor has made a one-half revolution under the admission of steam in the manner indicated, fresh steam will enter the rotor chambers by way of ports $1m^4$, $1m^2$ and $1m$, below the left abutment L 17, and at the same time by way of ports $2m^3$ and $2m'$, above the right abutment R 17. The steam which entered by way of ports $1m^4$, $1m^2$ and $1m$ will eventually exhaust through ports $2g^4$, $2g^2$, $2g$, respectively below the right abutment R 17 and the steam which entered by way of ports $2m^3$ and $2m^1$ will eventually exhaust through ports $1g^3$ and $1g^1$ respectively, above the left abutment L 17.

The steam which exhausted through the $1g$ group of ports above abutment L 17 flows by way of ports and passages hereinafter referred to, through a valve 56 opening into the exhaust pipe 37 (Fig. 13) and steam which exhausted through the $2g$ ports below the abutment R 17 likewise flows through a valve 57 opening into said exhaust pipe 37.

When the engine is set for clockwise rotation, the live steam will enter chambers by way of $1g$ and $2g$ ports and will exhaust through the $2m$ and $1m$ ports respectively, as will now be readily understood in view of the detailed explanation already given as to the sequence of steam flow in the counter-clockwise rotation of the engine. The steam exhausting from the $2m$ ports will pass through valve 58 opening into the exhaust pipe 37 while the steam exhausting through the $1m$ ports will pass through valve 59 opening into the said exhaust pipe. When exhaust valves 56 and 57 are open, valves 58 and 59 are closed, and vice-versa.

Figure 10:
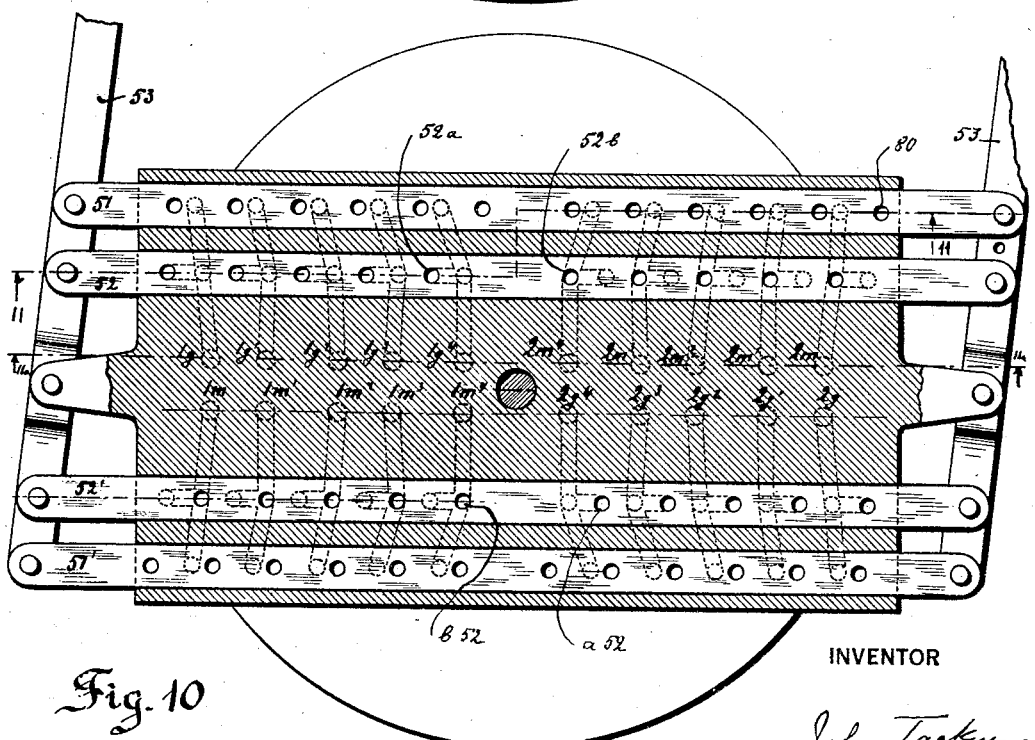
Fig. 10 is a vertical sectional view taken on line 10—10 of Fig. 2.

When the steam is used in multiple expansion stages, it will enter $m^4$ or $g^4$ depending on which way the engine is set to rotate (see Figs. 1 and 10). Assuming the engine is set to rotate counter-clockwise, as viewed from Fig. 1, steam enters through $2m^4$. After rotating the segmental member one half revolution the steam will exhaust through port $1g^4$ from whence it passes by a pipe $1x$ (Figs. 11 and 13) to port $2m^3$. After expanding in chamber $T^2$ the steam will leave through port $1g^3$ from whence it leaves by pipe $1x^1$ to port $2m^2$. After expanding in chamber $T^3$ it passes through port $1g^2$ from whence it passes by pipe $1x^2$ to port $2m^1$. After expanding in chamber $S^2$ it exhausts through port $1g^1$ from whence it passes by pipe $1x^3$ to port $2m$. After expanding in chamber $S^3$ it exhausts through port $1g$ and flows through a pipe 60 opening into the branch $60a$ of the exhaust pipe 37.

After the first charge of steam has entered through $2m^4$ and the segment 5 has rotated through a one-half revolution, a second charge will enter through port $1m^4$. After expansion the steam will leave by port $2g^4$ and flow by way of pipe $2x$ into port $1m^3$; after expansion it will leave through port $2g^3$ from whence it passes by pipe $2x'$ to port $1m^2$; after expansion it leaves through port $2g^2$ from whence it passes by pipe $2x^2$ to port $1m^1$; after expansion it leaves through port $2g^1$ from whence it passes by pipe $2x^3$ to port $1m$; after expansion it passes through port $2g$ from whence it exhausts through pipe 62 which opens into the branch $62a$ of the exhaust pipe 37.

When the engine is set to run clockwise, using the steam in multiple expansion stages, the steam will enter the $1g^4$ and $2g^4$ ports instead of the $2m^4$ and $1m^4$ ports and will flow into the rotor expansive chambers one after the other as will now be readily understood. The steam which entered through port $1g^4$ will finally exhaust through the $2m$ port and the pipe $62b$ which opens into the branch $62a$ of the exhaust pipe 37 and the steam which enters through port $2g^4$ will finally exhaust through the $1m$ port and pipe $60b$ which opens into the branch $60a$ of the exhaust pipe 37.

Valve bars 51 and 52 mutually cooperate to control the flow of steam to the cylinder chambers as do bars $51'$ and $52'$. Fig. 11 shows the cooperative relationship between bars 51 and 52 and the control exercised by the bars when the engine is set to run as a multiple expansion engine. The $m$ and $g$ passages in leading away from the cylinder chambers each divides into two branches at the multiple expansion controlling bar 52 (and $52'$). Each bar 52 and $52'$ passes through two series of partitions $a$, $a^1$, $a^2$, $a^3$ and $a^4$, one series on each side of the rotor axis. The branches leading from passage $1g^4$ pass one on each side of partition $a^4$;

those from passage $1g^3$ on each side of partition $a^3$, etc. The adjacent partitions form the side walls of steam chambers. The $x$ pipes, previously referred to, cross-connect said steam chambers with similar steam chambers associated with the $2m$ passages.

The bar 52 has two sets of ports, $52^a$ and $52^b$, the first set cooperating with the $1g$ ports and the second set cooperating with the $2m$ ports (Fig. 10). The corresponding ports in bar 52' are identified by the same numeral 52 with the corresponding letter in front as $a52$ and $b52$.

Again referring to Figs. 10 and 11 it can be assumed that the position of the bar 52 (and 52') is such that the engine will run counter-clockwise using the steam in multiple expansion stages. Considering Figs. 1 and 11 together, steam after having entered through $2m^4$ exhausts by way of $1g^4$ and by way of pipe $1x$ into $2m^3$. In Fig. 11 the bar 52 is positioned in such a manner that the $1g^4$ passages exhaust into the chamber formed between the partitions $a^4$ and $a^3$, this chamber and the corresponding chamber associated with the $2m$ ports being connected by the $1x$ pipe. The other chambers are correspondingly connected as will now be readily understood. Referring to Fig. 11 there is shown a passage 75 at the right of partition $a^4$ and in Fig. 9 a similar passage 75' diagonally opposite. In the position of the bars 52 and 52' as shown, the passages 75, 75' are closed off from the two $g^4$ ports. When, however, the engine is set to run counter-clockwise in multiple expansion stages, these ports 75, 75' will be open to admit steam to the $g^4$ ports. In the position of the bars 52 and 52' as shown, steam is admitted into the $M^4$ ports by way of steam ports 76 and 76' (Fig. 9).

Steam flows into port 76 for passage into the $2m^4$ ports when the piston 25 of abutment R 17 is in the position shown in Fig. 9. Steam flows from port $45^a$ into a chamber into which the port 76 opens. When the piston R 25 travels outward to the end of its stroke thereby cutting off $45a$ piston L 25 completes its inward stroke thereby opening up passage $45b$. Live steam then flows into port 76' which connects with port $1m^4$. It should be noted that even though steam may flow through ports $46^a$ and $46^b$ the position of the bars 52 and 52' is such that the ports 75 and 75' leading to the $g^4$ ports or passages are closed. If the engine were rotating in the opposite direction the ports 75 and 75' would be open and ports 76, 76' closed. The steam which entered through port $2m^4$ (76 in Fig. 9) will exhaust through port $1g$ (77 in Fig. 9). Steam which entered through port $1m^4$ (76' in Fig. 9) will exhaust through port $2g$ (77' in Fig. 9). When steam enters through port $1g^4$ (75 in Fig. 9) it will exhaust through port $2m$ (78 in Fig. 9) and when it enters through port $2g^4$ (75' in Fig. 9) it will exhaust through port $1m$ (78' in Fig. 9).

We will next consider the relative disposition of the valve bars when the engine is to be run as a single or direct expansion engine. Fig. 11 shows the bar 51 as closing all the ports controlled by the bar. The position shown is the position of the bar when the engine is set for multiple expansion operation. For single expansion, the bar 51 will be moved to position certain of its parts (all but one at one or the other end of a series) in alignment with the $2m$ ports which lead from the cylinder expansion chambers. By moving the bar 51 to the right the engine will run counter-clockwise.

The live steam for operating the engine as a direct acting engine enters a pair of 2N steam chests or a pair of 1N steam chests depending on the direction of rotation of the engine. We will assume the steam enters the 2N steam chests. A three way valve shown in Fig. 12 and identified by letter $n$ in Fig. 13 admits steam to the 2N' steam chests but not to the 1N steam chest. Valve $n'$ admits steam to the 2N steam chest but not to the 1N' steam chest. If the engine is set to run in the reverse direction the arrangement will be vice versa. The valves $n$ and $n'$ are connected for operation by the levers 53 through suitable links $1n$ and levers $nx$.

Each of these N steam chests has ports which can be considered as the outer terminal of the $m$ or $g$ ports. For example the ports in steam chest 2N' are the outer terminals of the $2m$ ports; those in the steam chest 2N of the $1m$ ports; those in steam chest 1N' of the $1g$ ports; and those in steam chest 1N of the $2g$ ports. Steam is admitted to the rotor thru the steam chest 31 only when operating in multiple expansion. On direct expansion the steam travels directly from the pipe 35 to the chests 2N, 2N', $n$ and N'. However, even on direct expansion some of the steam enters the steam chest 31 thru a branch from pipe 35. Theoretically one steam inlet to the chest 31 is sufficient; however, I prefer to provide an inlet to the chest 31 on each side of the rotor shaft 4 for the sake of smoothness and uniformity of operation, as will be understood.

Referring to Fig. 9 and the 2N' steam chest it can be assumed that steam is being admitted to ports $2m^4$ and $2m^2$, and $2m$ (see Fig. 1) and at the same time is being admitted to ports $1m'$ and $1m^3$ in steam chest 2N. In the steam chest 2N' ports $2m^3$ and $2m^1$ are covered by the slide valves therein (see Fig. 11) and in steam chest 2N; the ports $1m, 1m^2$ and $1m^4$ are covered for reasons that will be apparent from Fig. 1, namely, that it would serve no useful purpose to allow steam to enter said closed ports. The 1N' steam chest is open to exhaust, ports $1g'$ and $g^3$ being open and corresponding to the similarly identified ports in Fig. 1. In steam chest 1N, ports $2g^4$, $2g^2$, $2g$ are open these ports being the same as the similarly identified ports in Fig. 1.

The 2N and 1N steam chests contain fewer valves than the 1N' and 2N' steam chests but this is merely to show how the valves can be arranged.

The valves within the steam chests in which the $m$ and $g$ ports terminate are mounted on valve rods as 81 and 82. The said rods are linked together by means of levers 83, the levers being pivoted on the engine frame. The rods 81 each have a piston L 84 and R 84 respectively. A valve 85 controls the passage of steam to the piston head side of the pistons.

This valve is connected by suitable linkage to one of the levers 53 for movement therewith. The two passages controlled by the valve 85 are indicated at 86 and 87. When steam flows into port 86 it moves the piston R 84 to the right (Fig. 9) whereby the valves in the steam chest 2N' will be moved to uncover certain ports as has already been explained. The valves in the other steam chests 1N', 2N and 1N will also be moved to uncover certain ports and close others as will be readily understood from the preceding description. When passage 86 is open the passage 87 is closed and vice versa. Where steam is cut off from passage 86, not by the valve 85 but by the movement of the abutment piston controlling port 45a, the pressure of the steam in 2N' steam chest will act on the plunger-like extension of the piston R 84 and move the piston inwardly thereby positioning the valves operated by the piston in proper position for the second half revolution of the rotor. As long as the engine is rotating in one direction the valve 85 will remain in the position shown in Fig. 9.

It will be noted that the construction and arrangement of the ports controlled by the piston R 84 and valves $2m$ to $2m^4$, as illustrated in Fig. 11, are slightly modified from the showing, for instance, in Fig. 9, but this is done to more clearly elucidate the principles of my invention, it being understood that numerous parts are illustrated only in a diagrammatic way and that the relative size and proportions of parts has not been adhered to.

From the foregoing it will be seen that I have devised a simple form of rotary engine capable of being operated in either direction, either as a multiple expansion or as a multiple direct engine. The form herein illustrated and described is expressly understood to be one embodiment only of my invention. It is therefore to be understood that I do not limit myself thereto as many other embodiments may be resorted to and numerous changes may be made in points of detail without devailing from the true spirit and scope of my invention. It is also to be understood that my invention, so far as the embodiment herein illustrated and described is concerned, is, in many respects, only diagrammatically illustrated to best show how the same can be carried out in practice by those skilled in the art.

What I claim is:

1. An engine having multiple stationary cylinders arranged about a common axis in telescoped relation, annular rotor means arranged within each cylinder, said means adapted to be moved in unison about the common axis of said cylinders by expansive fluid admitted into the cylinders, and a plurality of one or more non-rotatable means for each rotor means extending through and common to all of the cylinders and adapted to reciprocate as the rotor turns.

2. An engine having multiple stationary cylinders arranged about a common axis in telescoped relation, a rotor having annular members disposed between the cylinders, and a plurality of one or more non-rotatable means for each annular member straddling said members and passing through and common to all of the cylinders, said means being shiftable toward and from the axis of the rotor as it is rotated.

3. An engine having multiple stationary cylinders arranged about a common axis in telescoped relation, a rotor having annular members disposed between the cylinders and adapted to be acted on by expansive fluid, one or more abutments each straddling all of the annular members and being movable toward and away from the axis of the rotor and through the cylinder walls, and means controlled by the rotation of the rotor for causing reciprocation of said abutments.

4. An engine having multiple stationary cylinders arranged about a common axis in telescoped relation, a rotor having annular members disposed between the cylinders and adapted to be acted on by expansive fluid, one or more abutments each straddling all of the annular members and being movable toward and away from the axis of the rotor and through the cylinder walls, means controlled by the rotation of the rotor for causing reciprocation of said abutments, and means permitting expansive fluid to enter the central cylinder and expand therefrom into the next larger cylinders in succession.

5. An engine having multiple stationary cylinders arranged about a common axis in telescoped relation, a rotor having annular members disposed between the cylinders and adapted to be acted on by expansive fluid, abutments straddling the annular members and being movable toward and away from the axis of the rotor and through the cylinder walls, means controlled by the rotation of the rotor for causing reciprocation of said abutments, means permitting expansive fluid to enter the central cylinder and expand therefrom into the next larger cylinders in succession; and means for converting the engine from a multiple expansion engine to a multiple direct acting engine.

6. A rotary engine having a plurality of expansive-fluid-receiving chambers, rotor members in each of said chambers, a pair of abutments each passing through all of said chambers and movable relatively to said chambers in a given sequence with the rotation of the rotor, and means adapting the engine to run as a multiple expansion machine or as a multiple direct-acting machine.

7. In a rotary engine, a plurality of cylinders telescopically arranged about a common axis and in spaced relation to each other to form annular chambers between the respective cylinders, a rotor shaft extending through the central cylinder, a plurality of ring-like rotor elements disposed one in each annular chamber and affixed to said shaft, each of said elements consisting of two semicircular sections of different radii whereby two cam-like off-sets are formed at the jointure of said sections, the smaller section having an inner redius substantially the same as that of the inner adjacent cylinder to effect a steam tight joint therewith and the outer radius of the larger section being substantially the same as that of the outer adjacent cylinder to effect a steam tight joint therewith, a plate reciprocable in a plane parallel with and passing through the axis of the rotor shaft and extending through the cylinder walls on one side of their common axis, said plate having slots through which said elements move as they turn, a second plate operating in the same manner as the first mentioned plate but disposed on the other side of said axis, two parallel series of ports associated with each plate and opening into the cylinders, two series of ports being disposed one series on one side of the plate and the other series on the opposite side of the plate, means for reciprocating the plates in synchronism with the rotation of said shaft, and means for periodically admitting expansive fluid behind said offsets whereby to effect rotation of the rotor shaft.

8. In a rotary engine, a plurality of cylinders telescopically arranged about a common axis and in spaced relation to each other to form annular chambers between the respective cylinders, a rotor shaft extending through the central cylinder, a plurality of ring-like rotor elements disposed one in each annular chamber and affixed to said shaft, each of said elements consisting of two semicircular sections of different radii whereby two cam-like offsets are formed at the jointure of said sections, the smaller section having an inner radius substantially the same as that of the inner adjacent cylinder to effect a steam tight joint therewith and the outer radius of the larger section being substantially the same as that of the outer adjacent cylinder to effect a steam tight joint therewith, a plate reciprocable in a plane parallel with and passing through the axis of the rotor shaft and extending through the cylinder walls on one side of their common axis said plate having slots through which said elements move as they turn, a second plate operating in the same manner as the first mentioned plate but disposed on the other side of said axis, two parallel series of ports associated with each plate and opening into the cylinders, two series of ports being disposed one series on each side of the plate and the other series on the opposite side of the plate, means for reciprocating the plates as the offsets of the rotor elements enter said slots, and means for admitting expansive fluid behind said offsets after they have passed through said slots whereby to effect rotation of the rotor shaft.

9. An engine having multiple stationary cylinders arranged about a common axis in telescoped relation, a rotor having annular members disposed between the cylinders, and means for straddling each annular member of the rotor having a single element passing through a cylinder into engagement with surfaces of annular rotor members on opposite sides of the cylinder through which it passes, said element being shiftable toward and from the axis of the rotor as it is rotated, and means for controlling the flow of the expansive fluid to the cylinders including means for controlling the direction of movement of said rotor.

10. An engine having multiple stationary cylinders arranged about a common axis in telescoped relation, a rotor having annular members disposed between the cylinders and adapted to be acted on by expansive fluid, abutments straddling the annular members and being movable toward and away from the axis of the rotor and through the cylinder walls, means controlled by the rotation of the rotor for causing reciprocation of said abutments, and means for controlling the flow of expansive fluid directly or in multiple expansion into said cylinders.

11. An engine having multiple stationary cylinders arranged about a common axis in telescoped relation, a rotor having annular members disposed between the cylinders and adapted to be acted on by expansive fluid, abutments straddling the annular members and being movable toward and away from the axis of the rotor and through the cylinder walls, means controlled by the rotation of the rotor for causing reciprocation of said abutments, and mean permitting expansive fluid to enter directly into all of the cylinders or to enter one cylinder and expand therefrom into the next cylinders in succession.

12. An engine having multiple stationary cylinders arranged about a common axis in telescoped relation, a rotor having annular members disposed between the cylinders and adapted to be acted on by expansive fluid, abutments straddling the annular members and being movable toward and away from the axis of the rotor and through the cylinder walls, means controlled by the rotation of the rotor for causing reciprocation of said abutments, means permitting expansive fluid to enter one cylinder and expand therefrom into the next cylinders in succession, and means for converting the engine from a multiple expansion engine to a multiple direct acting engine.

13. A rotary engine having a plurality of expansive-fluid-receiving chambers, rotor members in each of said chambers, a pair of abutments each passing through all of said chambers and movable relatively to said chambers in a given sequence with the rotation of the rotor, and means adapting the engine to run in either direction as a multiple expansion machine or as a multiple direct-acting machine.

14. A rotary engine having a plurality of expansive-fluid-receiving chambers, rotor members in each of said chambers, a pair of abutments for each rotor member passing through the chamber walls and movable transversely thereof, means controlled by the rotation of the rotor for reciprocating the abutments, and means adapting the engine to run in either direction as a multiple expansion or as a multiple direct acting machine.

15. A rotary engine comprising a plurality of expansive-fluid-receiving chambers of annular form, an annular rotor member within each chamber, each of said members formed on two diameters whereby each of said chambers are divided into two non-communicating portions, valve means located upon the engine for simultaneously admitting expansive fluid to each of said portions of the chamber to enable the engine to run as a direct acting machine, and valve means also located upon the engine together with cross-connecting pipes for admitting expansive fluid to said portions of the chambers in succession to enable the engine to run as a multiple expansion machine.

16. In a rotary engine, a plurality of cylinders telescopically arranged about a common axis and in spaced relation of each other to form annular chambers between the respective cylinders, a rotor shaft extending through the central cylinder, a plurality of ringlike rotor elements disposed one in each annular chamber and affixed concentrically to said shaft, each of said elements consisting of two approximately semi-circular sections of different radii whereby two cam-like offsets are formed at the jointure of said sections, the smaller section having an inner radius substantially the same as that of the inner adjacent cylinder to effect a tight moving contact therewith and the outer radius of the larger section being substantially the same as that of the outer adjacent cylinder to effect a tight moving contact therewith, a plate reciprocable in a plane passing through the axis of the rotor shaft and extending through the cylinder walls on one side of their common axis, said plate having slots through which said rotor elements move as they turn, a second plate operating in the same manner as the first mentioned plate but disposed on the other side of said axis, two parallel series of ports associated with each plate and opening into the cylinders one series on either side of each plate, means for reciprocating the plates as the offsets of the rotor elements enter said slots, and means for admitting expansive fluid behind said offsets after they have passed through said slots whereby to effect rotation of the rotor shaft.

17. A rotary engine as characterized in claim 16 having head plates or cylinder-heads at each end of cylinders containing grooves or guides coinciding with the plane of said reciprocating plates, within which the ends of said plates slide or reciprocate in their passage through the said cylinder walls, said grooves or guides holding the reciprocating plates firmly in moving contact with said cylinder-heads thereby giving support and strength to said plates in all positions.

18. A rotary engine as characterized in claim 16 with a plate or plates reciprocable in a plane parallel with and passing through the axis of the rotor shaft and extending through the cylinder walls on one side of their common axis, said plate or plates moving in intermittent synchronism through the walls of the cylinders in tight moving contact with the offsets of the said annular rotors thus forming the said subdivisions alternately in one chamber and then in the adjacent chamber a second plate or plates operating in the same manner as the first mentioned plate but disposed on the other side of the axis; two parallel series of ports associated with each plate and opening into the cylinders one series on either side of each plate, means for reciprocating the plates as the offsets of the rotor elements pass by them to form new sub-divisions and means for admitting expansive-fluid behind said offsets after they have formed said sub-divisions or expansive chambers whereby to effect the rotation of the rotor shaft.

19. An engine having multiple stationary cylinders arranged about a common axis in telescoped relation, annular rotor means arranged within each cylinder, said annular rotor means adapted to be moved in timed relationship about the common axis of said cylinders by expansive fluid admitted into the cylinders, and means mounted in and extending through a cylinder in a radial plane and being adapted to engage surfaces of said annular rotor means on opposite sides of the cylinder through which it passes and to be positively reciprocated in opposite directions thereby as the rotor turns.

20. An engine having multiple stationary cylinders arranged about a common axis in telescoped relation, a rotor having annular members disposed between the cylinders, and means for straddling each annular member including an abutment mounted in and passing through a cylinder into engagement with surfaces of annular rotor members on opposite sides of the cylinder through which it passes, said abutment being positively shiftable by the rotor toward and from the axis of said rotor as it is rotated.

21. An engine having multiple stationary cylinders arranged about a common axis in telescoped relation, a rotor having annular members disposed between the cylinders and adapted to be acted on by expansive fluid, an abutment mounted in and passing through a cylinder and into engagement with surfaces of annular rotor members on opposite sides of the cylinder through which it passes, said element being movable toward and away from the axis of the rotor and through said cylinder wall, means controlled by the rotation of the rotor for causing reciprocation of said abutments, and means permitting expansive fluid to enter the central cylinder and expand therefrom into the next larger cylinders in succession.

In testimony whereof, I have hereunto set my hand.

JOHN TACKMAN.